United States Patent

Preston

(10) Patent No.: US 6,805,323 B2
(45) Date of Patent: Oct. 19, 2004

(54) PNEUMATIC PARACHUTE RISER CONTROL

(75) Inventor: Daniel Preston, Kew Gardens, NY (US)

(73) Assignee: Atair Aerospace, Inc., Brooklyn, NY (US)

( * ) Notice: Subject to any disclaimer, the term of this patent is extended or adjusted under 35 U.S.C. 154(b) by 0 days.

(21) Appl. No.: 10/434,318

(22) Filed: May 7, 2003

(65) Prior Publication Data

US 2004/0026570 A1 Feb. 12, 2004

Related U.S. Application Data

(60) Provisional application No. 60/378,924, filed on May 7, 2002.

(51) Int. Cl.$^7$ .............................................. B64D 17/00
(52) U.S. Cl. ........................................ 244/142; 244/147
(58) Field of Search ............................... 244/152, 148, 244/142, 143, 147

(56) References Cited

U.S. PATENT DOCUMENTS

| | | | | |
|---|---|---|---|---|
| 2,730,317 A | * | 1/1956 | Onanian | 244/152 |
| 3,829,045 A | * | 8/1974 | Snyder | 244/152 |
| 4,127,246 A | * | 11/1978 | Andres | 244/138 R |
| 4,722,497 A | * | 2/1988 | Stanford et al. | 244/152 |
| 4,850,554 A | * | 7/1989 | Strong | 244/151 R |
| 5,080,305 A | * | 1/1992 | Stencel et al. | 244/152 |
| 5,678,788 A | * | 10/1997 | Hetzer et al. | 244/152 |
| 6,050,524 A | * | 4/2000 | Haggard | 244/151 A |
| 6,131,856 A | * | 10/2000 | Brown | 244/152 |
| 6,224,019 B1 | * | 5/2001 | Peterson et al. | 244/138 R |
| 6,575,408 B2 | * | 6/2003 | Benney et al. | 244/152 |
| 2003/0197095 A1 | * | 10/2003 | Preston | 244/152 |

* cited by examiner

*Primary Examiner*—Charles T. Jordon
*Assistant Examiner*—Stephen A Holzen
(74) *Attorney, Agent, or Firm*—Bourque & Associates, P.A.

(57) ABSTRACT

An automatic controlled parachute includes a parachute canopy, a flight controller and risers connecting the canopy to the flight controller. Pneumatic actuators are connected along the risers. The flight controller operates the pneumatic actuators to control the length of the risers. The direction of flight of the parachute is controlled by the length of the risers.

9 Claims, 2 Drawing Sheets

PNEUMATIC PARACHUTE RISER CONTROL

This application claims the benefit of Provisional Application No. 60/378,924, filed May 7, 2002.

BACKGROUND OF THE INVENTION

1. Field of the Invention

The present invention relates to automatic controlled parachute systems. More particularly, it relates to a pneumatic actuator system for controlling riser webs and weight distribution for remote or autonomous control of parachute flight.

2. Discussion of Related Art

Parachutes have evolved over the years into highly sophisticated systems, and often include features that improve the safety, maneuverability, and overall reliability of the parachutes. Initially, parachutes included a round canopy. A skydiver was connected to the canopy via a harness/container to suspension lines disposed around the periphery of the canopy. Such parachutes severely lacked control. The user was driven about by winds with little mechanism for altering direction. Furthermore, such parachutes had a single descent rate based upon the size of the canopy and the weight of the parachutist.

In the mid-1960's the parasol canopy was invented. Since then, variations of the parasol canopy have replaced round canopies for most applications, particularly for aeronautics and the sport industry. The parasol canopy, also known as a gliding or ram air parachute, is formed of two layers of material—a top skin and a bottom skin. The skins may have different shapes but are commonly rectangular or elliptical. The two layers are separated by vertical ribs to form cells. The top and bottom skins are separated at the lower front of the canopy to form inlets. During descent, air enters the cells of the canopy through the inlets. The vertical ribs are shaped to maintain the canopy in the form of an airfoil when filled with air. Suspensions lines are attached along at least some of the ribs to maintain the orientation of the canopy relative to the pilot. The canopy of the ram air parachute functions as a wing to provide lift and forward motion. Guidelines operated by the user allow deformation of the canopy to control direction and speed. Ram air parachutes have a high degree of lift and maneuverability.

Despite the increased lift from a ram air parachute, round canopies are still used for cargo drops. However, as the weight of cargo increases, the size of the canopy must increase to obtain an appropriate descent rate. Reasonable sizes of round parachutes greatly limit the amount of cargo which can be dropped. Therefore, a need exists for a parachute system which can carry additional cargo weight. Additionally, accurate placement of cargo drops from high altitude with round parachutes or unguided is impossible. Adjustments can be made for prevailing winds at various altitudes but the cargo is likely to be drift off course due to variations. Furthermore, improvements in surface-to-air missiles requires higher altitude drops in order to protect aircraft. In military use, round parachutes are generally used from an altitude around 1000 feet to ensure accurate placement. However, new, inexpensive, hand held surface-to-air missiles can put in jeopardy airplanes up to 25,000 feet in altitude. Current military technique is to use a special forces soldier to pilot both parachute and cargo to the ground from altitudes of 25–35,000 feet. This limits cargo to 650 pounds, as it must be attached to a human. Therefore, a need exists for an autonomous guided parachute system for cargo which can operate at high altitudes as well as scale to heavier cargo weights.

Parachute systems, either manned or automatic can be controlled in two different manners. These two manners may be used on round parachutes with minimal control, but are very effective for control of ram air or gliding parachutes. In one manner, steering or brake lines are attached to part of the parachute. By pulling on the lines, the aerodynamics of the parachute are changed to control the flight direction of the parachute. Manned parachutes generally use this method of control. In the second manner, the weight distribution under the parachute is changed. Typically, the suspension lines from the parachute are attached together in quadrants front left and right, and back left and right. Each group of lines are attached to a riser. Risers are typically structural webbing. They attach a group of suspension lines to the harness of the parachute system. Often, the risers incorporate a quick release mechanism in order to separate the parachute from the harness in the case of malfunction. If one of the risers is pulled, the weight under the parachute is shifted in that direction, which induces a turn in that direction.

Automatically controlled parachute systems may be used for unmanned parachute flights. Such systems allow cargo to be accurately dropped. The automatically controlled parachute may function autonomously or may be remotely controlled by an operator. In an automatically controlled parachute system, sensors are used to determine the position and flight information of the parachute system. The system then determines necessary changes in the flight direction and controls the parachute to provide those direction changes. In known systems, the brake lines of the parachute are used to control the direction of flight. As noted above, in order to control direction, the brake lines have to be shortened or lengthened.

Various devices are known for moving the brake lines. Most common are electric servo motors. Alternatively, the electric servo motors may be used to change the length of the risers to provide a weight shift for direction control. However, servo motors are ideal for high altitude drops. The cold temperatures, about −50° C. at 30,000 feet, limit the useable power from batteries for controlling the motors. Cold weather batteries have poor power density, necessitating large heavy packs to provide sufficient power. The use of dc motors and large battery packs greatly complicate a systems construction, operation and of critical importance cost.

Another system is described in U.S. patent application Ser. No. 10/315,466, filed Dec. 9, 2002 ("the '466 patent application"), assigned to the same assignee as the present invention and incorporated herein by reference. The '466 patent application describes flight controller for an automatically controlled parachute. In this system, pneumatic actuators are attached to the steering lines to provide direction control. This system is useful for high altitude operations because of the limited electrical needs. The power to move the actuators is stored in the form of compressed gas, not electricity. The power density of the compressed dry air or nitrogen is very high and remains unchanged for the purpose and the temperature range to be used. However, the significant deflection required by the steering lines requires an actuator with a long stroke or pulley system.

Another system proposes the use of McKinney muscle to control the risers of a round parachute. The McKinney muscle consists of a pneumatic rubber tube with an overbraid of crisscrossing reinforcement. When the tube is pressurized, it increases in diameter and decreases in length. The length can shrink by approximately 20% between an empty and a full tube. The McKenney muscle is built directly into at least some of the risers. In order to allow sufficient shortening of the riser, the riser must be excessively long. While round parachutes can accommodate long risers, they are not easily incorporated in a ram air or gliding wing parachute. Also, as the tube approaches maximum pressurization, the actuation force drops off to zero. Again, while a round parachute may utilize such an actuation system, it is not useful for a gliding wing system. The generated force vs. stroke curve is opposite to that required for a riser turn on a ram air wing. Finally, a significant amount of air is necessary for to provide a full stroke. A large gas tank is necessary as the power source for the system. The additional weight and size of the gas tank makes use of the system impractical in many situations.

SUMMARY OF THE INVENTION

According to an aspect of an invention, an automatic controllable parachute system includes a parachute canopy, a flight controller, and risers connecting the suspension lines of the parachute canopy to the flight controller. The flight controller includes a system for determining a desired direction for flight. Pneumatic piston actuators are incorporated into the risers of the parachute canopy. The pneumatic actuators are operated by the flight controller to alter the length of the risers for providing a turn. According to an aspect of the invention, the flight controller includes solenoids for controlling the pneumatic actuators. An electrical signal is sent from the flight controller to the solenoid. The solenoid causes the pneumatic actuator to open or close. A tank of compressed gas is used as the power source for the actuators. According to another aspect of the invention, the pneumatic piston actuators are positioned between and attached to portions of the webbing of the risers. According to another aspect of the invention the pneumatic piston actuators are mounted in a box containing the guidance system and utilize flexible cables as the piston rod. Such piston cables are plastic coated to effect a proper seal and attach to the riser to provide for a turn when retracted. The use of flexible cables allows for greater design possibilities as the cables can flex and pack up with the risers into the parachute container prior to deployment.

DETAILED DESCRIPTION

The present invention relates to a system and method for controlling the length of risers in an automatically controlled parachute system. The automatically controlled parachute system may be of any type having a flight controller for determining flight information and a desired direction for flight of the parachute. An example of such a flight controller is set forth in U.S. patent application Ser. No. 10/315,466, incorporated herein by reference. The '466 patent application discloses pneumatic actuators for controlling the steering or brake lines of a ram air canopy. The actuators are controlled by solenoids. In the present invention, these actuators would be omitted and replaced with the pneumatic actuators of the present invention. The solenoids would still be used to control the actuators of the present invention. Of course, the present invention is not limited to the flight control system of the '466 application. It may be used with any system providing signals for controlling flight direction. The signals are used to control pneumatic actuators of the present invention.

Figure 1:
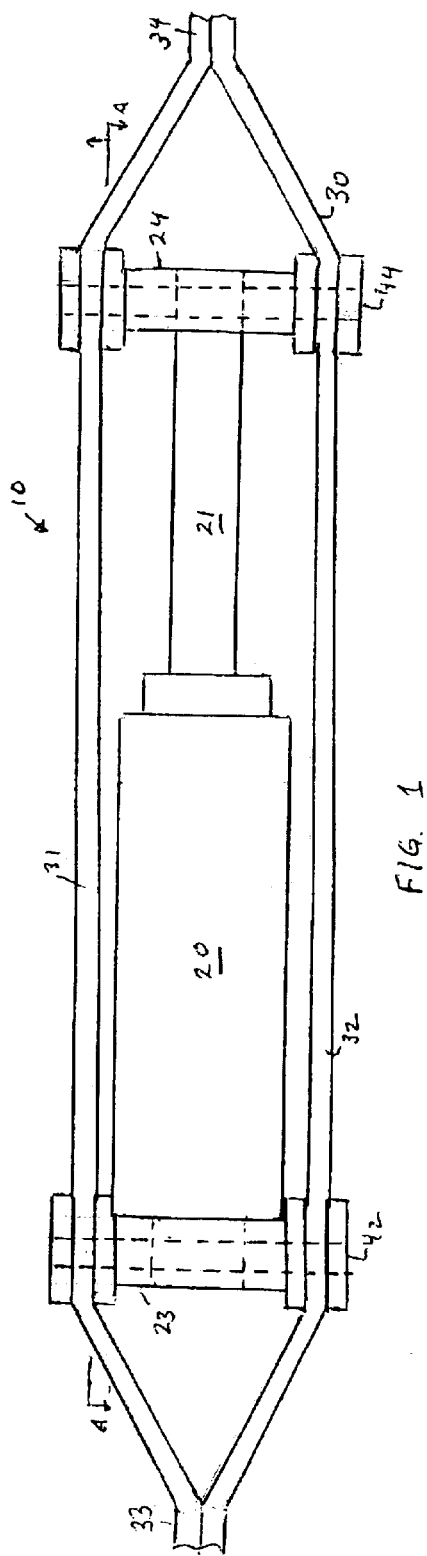
FIG. 1 is a side of a riser incorporating a pneumatic actuator according to an embodiment of the present invention.
Figure 2:
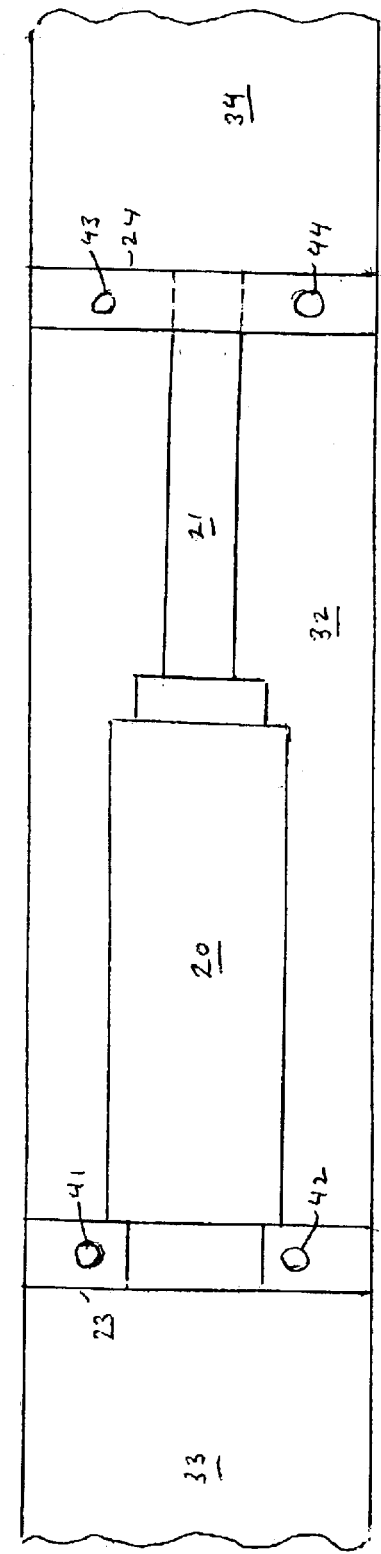
FIG. 2 is a cross sectional view of the riser of FIG. 2 along the line A—A.

FIGS. 1 and 2 illustrate a riser control system 10 using pneumatic actuators 20 according to an embodiment of the present invention. FIG. 1 is a side view and FIG. 2 is a cross sectional view below the upper webbing 31, along the line A—A. The rise control system 10 is incorporated into at least the front two risers of a parachute system. For greater control, it may be incorporated into all of the risers. Furthermore, the figures illustrate a single pneumatic actuator 20 associated with a riser. Multiple actuators could be used along the length of the riser to allow increased length control.

As illustrated in FIG. 1, a portion of the riser 30 includes two subparts 31 and 32. The webbing of the riser 30 and the subparts 31, 32 is of any known type for use with parachutes. The two subparts 31, 32 may be connected at the ends 33, 34 in any known manner. Typically, stitching is used to attached portions of webbing together. The subparts 31, 32 may extend for an entire length of the riser 30, or may be a mere portion of the total length. Alternatively, the riser 30 may be formed as a tube of webbing, with the subparts 31, 32 being opposing sides, with connected webbing between them.

A pneumatic actuator 20 is disposed between the subparts 31, 32 of the riser 30. While a pneumatic actuator is disclosed and preferred for operation with parachutes, a hydraulic actuator may be used in place of the pneumatic actuator. If hydraulic actuators are used, the flight controller would include a fluid source instead of the gas tank. Two connectors 23, 24 are attached to opposite ends of the subparts 31, 32 of the riser 30. The connectors 23, 24 may be attached to the subparts 31, 32 in any known manner. Preferably, rivets are used to attached the connectors 23, 24 to the subparts 32, 32. As illustrated in FIG. 1, a rivet 43, 44 extends through both riser subparts 31, 32 and the connector 23, 24. Four rivets 41, 42, 43, 44 are used to connect both connectors 23, 24 to the riser subparts 31, 32.

The pneumatic actuator 20 is positioned between the connectors 23, 24. The two ends of the pneumatic actuator 20 are attached to the connectors. The piston 21 extends through one connector 23, and the casing extends through the other connector 24. Upon operation, the pneumatic actuator is compressed by input of compressed gas. As the actuator is compressed, the ends 33, 34 of the riser subparts 31, 32 are moved closer together. The riser subparts 31, 32 become slack as the riser 30 is shortened. The entire stroke of the pneumatic actuator 20 can be used to shorten the riser 30. Also, the actuation force remains substantially constant over the entire stroke of the actuator.

Figure 3:
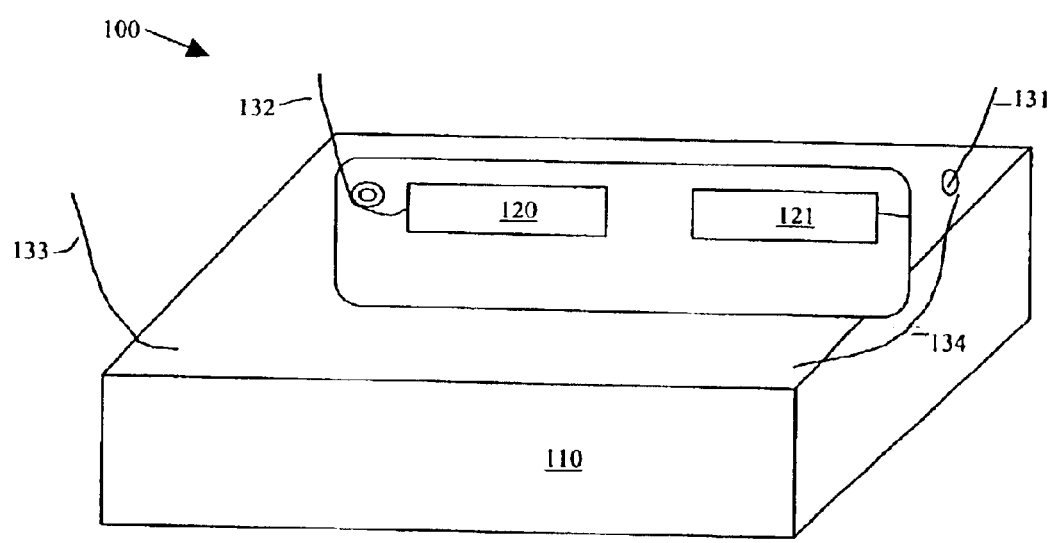
FIG. 3 is a partial cut away view of a riser control system according to a second embodiment of the present invention.

FIG. 3 illustrates a second embodiment of for riser control 100 in a parachute system of the present invention. This embodiment includes a control box 110 including the computer hardware and software for controlling the parachute system. The risers 131, 132, 133, 134 from the parachute canopy (not shown) are attached to the control box. As illustrated in FIG. 3, two of the risers 133, 134 are connected directly to the control box 110. These risers may also be attached to a harness attached to or surrounding the control box 110. The control box 110 includes two pneumatic or hydraulic actuators 120, 121. The control box 110 also includes a power source (not shown), such as a gas tank or fluid tank, for driving the actuators 120, 121 and controllers, such as solenoids (not shown), for controlling the actuators 120, 121. The actuators 120, 121 are connected to cables 131, 132 attached to two of the risers of the parachute system. The cables 131, 132 are plastic coated to effect a proper seal with the control box 110. Preferably, the actuators 120, 121 are connected to the front risers of a ram air canopy. However, they could be attached to the rear risers, or, alternatively, four actuators could be used, with each one being connected to one of the four risers. In order to control the parachute system, the actuators are moved to shorten or lengthen the attached risers. Changes in the length of the risers shifts the weight of the cargo and causes a turn. The actuators are operated in a manner similar to in the first embodiment of the invention. The flexible cables 131, 132 of the second embodiment, can flex and pack up with the risers into the parachute container prior to deployment.

While the present inventions have been described with a certain degree of particularity, it is obvious from the foregoing detailed description that one skilled in the art may make one or more modifications which are suggested by the above descriptions of the novel embodiments.

What is claimed is:

1. An automatic parachute control system comprising:
   a parachute, a plurality of suspension lines connected to the parachute, and a plurality of risers, each riser being connected to a set of the plurality of suspension lines;
   a flight controller; and
   at least one actuator controlled by the flight controller, wherein the actuator includes at least one end attached to at least one riser such that actuation of the actuator changes an effective length of the riser.

2. The automatic parachute system of claim 1, wherein a plurality of actuators are provided, each being attached to an end of a respective riser and each being controlled by the flight controller.

3. The automatic parachute system of claim 1, wherein the at least one actuator is a pneumatic actuator.

4. The automatic parachute system of claim 1, wherein the at least one actuator is a hydraulic actuator.

5. A method for automatically controlling a parachute comprising:
   providing a parachute, a plurality of suspension lines connected to the parachute, and a plurality of risers, each riser being connected to a set of the plurality of suspension lines;
   providing a flight controller; and
   providing at least one actuator having at least one end attached to at least one riser of a parachute, wherein the at least one riser is connected to a set of a plurality of suspension lines of the parachute, wherein the at least one actuator being controlled by the flight controller;
   determining a position of the parachute relative to a target position by the flight controller;
   steering the parachute toward the target position by actuating the actuator in at least at one direction, wherein actuating changes an effective length of the at least one riser resulting in the parachute changing directions.

6. The method according to claim 5, wherein at least a plurality of actuators are provided, each being attached to an end of a respective riser.

7. The automatic parachute system of claim 5, wherein the at least one riser includes:
   a first riser webbing; and
   a second riser webbing positioned facing the first webbing part; and
   wherein, the at least one actuators is positioned between and attached to the first riser webbing and the second riser webbing.

8. The automatic parachute system of claim 5, wherein the at least one actuator is a pneumatic actuator.

9. The automatic parachute system of claim 5, wherein the at least one actuator is a hydraulic actuator.

* * * * *